United States Patent
Guo et al.

(10) Patent No.: US 9,554,666 B2
(45) Date of Patent: Jan. 31, 2017

(54) BREWING MECHANISM OF COFFEE MACHINE

(75) Inventors: Jiangang Guo, Guangdong (CN);
Yongchun Zeng, Guangdong (CN);
Hou Xiong, Guangdong (CN)

(73) Assignee: GUANGDONG XINBAO ELECTRIC JOINT-STOCK LTD., Leliu Town (CN)

( * ) Notice: Subject to any disclaimer, the term of this patent is extended or adjusted under 35 U.S.C. 154(b) by 910 days.

(21) Appl. No.: 13/825,969

(22) PCT Filed: Jan. 15, 2011

(86) PCT No.: PCT/CN2011/070293
§ 371 (c)(1),
(2), (4) Date: Mar. 25, 2013

(87) PCT Pub. No.: WO2012/037784
PCT Pub. Date: Mar. 29, 2012

(65) Prior Publication Data
US 2013/0186282 A1    Jul. 25, 2013

(30) Foreign Application Priority Data

Sep. 26, 2010  (CN) .......................... 2010 1 0293009

(51) Int. Cl.
*A47J 31/40* (2006.01)
*A47J 31/36* (2006.01)

(52) U.S. Cl.
CPC ........... *A47J 31/407* (2013.01); *A47J 31/3638* (2013.01)

(58) Field of Classification Search
CPC .... A47J 31/0663; A47J 31/32; A47J 31/3614; A47J 31/3619; B65D 85/8043
(Continued)

(56) References Cited

U.S. PATENT DOCUMENTS

| | | |
|---|---|---|
| 5,794,519 A | 8/1998 | Fischer |
| 6,026,732 A | 2/2000 | Kollep et al. |

(Continued)

FOREIGN PATENT DOCUMENTS

| | | |
|---|---|---|
| CN | 1384718 A | 12/2002 |
| CN | 1781420 A | 6/2006 |
| EP | 1440644 A1 | 7/2004 |

*Primary Examiner* — David Angwin
*Assistant Examiner* — Jimmy Chou
(74) *Attorney, Agent, or Firm* — Muncy, Geissler, Olds & Lowe, P.C.

(57) ABSTRACT

The present invention relates to a brewing mechanism for coffee machine, comprising an upper cover assembly (2) and a lower main body (16). The upper cover assembly (2) comprises an inlet piercing needle (9) fixed in the upper cover assembly and a bottom piercing needle (14) fixed in the lower main body, with the inlet piercing needle connected with an inlet of a coffee machine. The upper cover assembly (2) also comprises a left sliding block (3) and a right sliding block (3.1) arranged within sliding slots respectively provided at a left side and a right side of the upper cover assembly, with the left sliding block and the right sliding block capable of sliding along the sliding slots. A left reset spring (4) and a right reset spring (4.1) are respectively provided within the left sliding block and the right sliding block. A left fixing sheet (5) and a right fixing sheet (5.1) which are fixed on the upper cover assembly are respectively provided at an outer side of the left sliding block and an outer side of the right sliding block. A left hook (3.2) and a right hook (3.3) are respectively provided at an inner side of the left sliding block and an inner side of the right sliding block. The left hook and the right hook are capable of hooking two sides of the capsule, and automatically hooking out the capsule from the brewing chamber when the upper cover assembly rotates, making the capsule fall into the capsule receiving plate. The present invention has simple (Continued)

structure, convenient operation, high safety and reliable performance.

10 Claims, 6 Drawing Sheets

(58) Field of Classification Search
USPC .................................. 99/302 R, 295, 289 R
See application file for complete search history.

(56) References Cited

U.S. PATENT DOCUMENTS

| | | | | |
|---|---|---|---|---|
| 7,640,842 B2* | 1/2010 | Bardazzi | ............. | A47J 31/0673 99/295 |
| 7,827,905 B2* | 11/2010 | Bardazzi | ............... | A47J 31/368 99/289 R |
| 7,946,217 B2* | 5/2011 | Favre | .................. | A47J 31/0668 426/433 |
| 8,443,717 B2* | 5/2013 | Venturi | ............. | B65D 85/8043 426/77 |
| 2001/0011502 A1* | 8/2001 | Bonanno | ................. | A47J 31/36 99/302 R |
| 2001/0052294 A1* | 12/2001 | Schmed | ............... | A47J 31/3628 99/295 |
| 2002/0023543 A1* | 2/2002 | Schmed | ............... | A47J 31/3623 99/295 |
| 2002/0144603 A1* | 10/2002 | Taylor | .................... | A47J 31/32 99/295 |
| 2005/0172821 A1* | 8/2005 | Chen | ................... | A47J 31/0668 99/279 |
| 2008/0250936 A1* | 10/2008 | Cortese | ............... | A47J 31/0668 99/295 |
| 2009/0126577 A1* | 5/2009 | Ternite | ................ | A47J 31/0673 99/295 |
| 2009/0249961 A1* | 10/2009 | Cheng | ................ | A47J 31/3638 99/289 R |
| 2010/0011965 A1* | 1/2010 | Turi | ...................... | A47J 31/369 99/289 R |
| 2010/0269705 A1* | 10/2010 | Zonelli | ............... | A47J 31/3628 99/295 |
| 2010/0300300 A1* | 12/2010 | Denisart | ............... | F16K 11/027 99/302 R |

\* cited by examiner

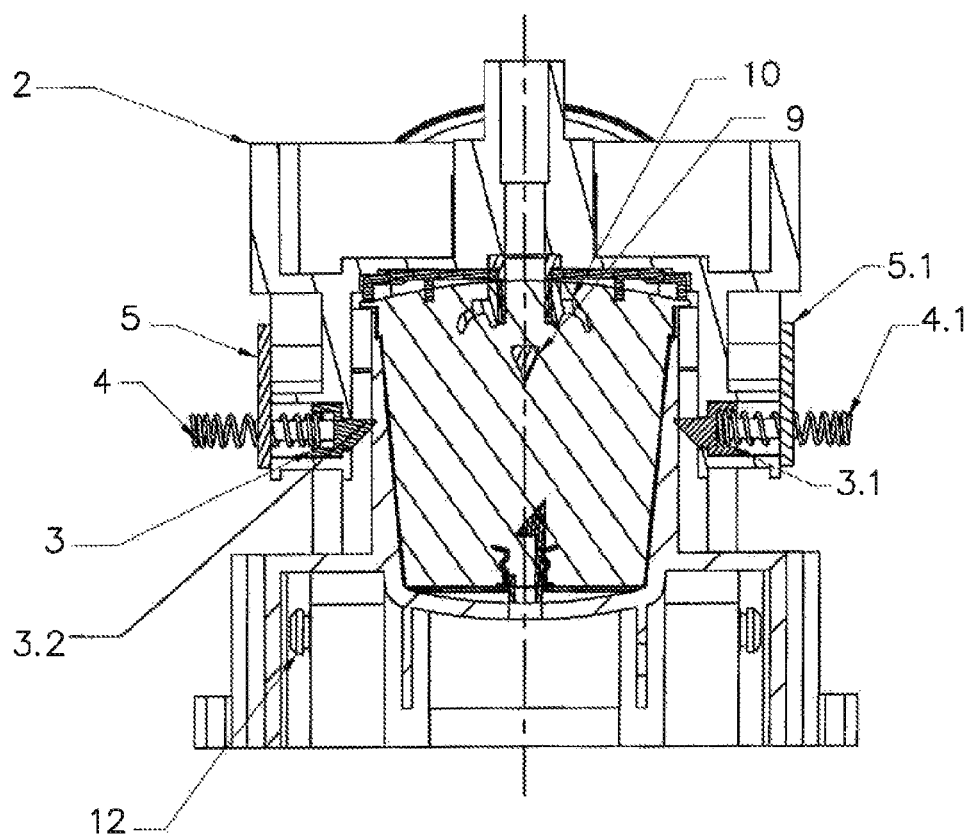
FIG 2.1

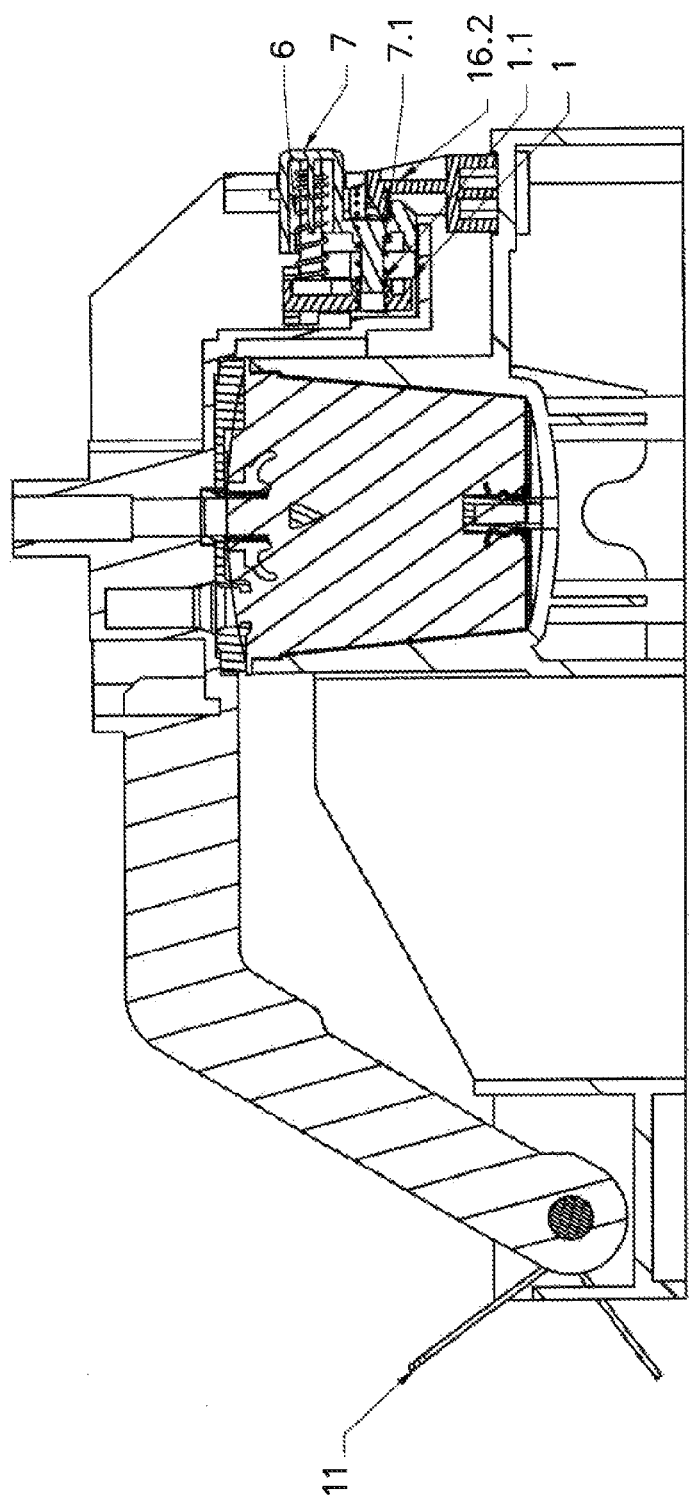
FIG 2.2

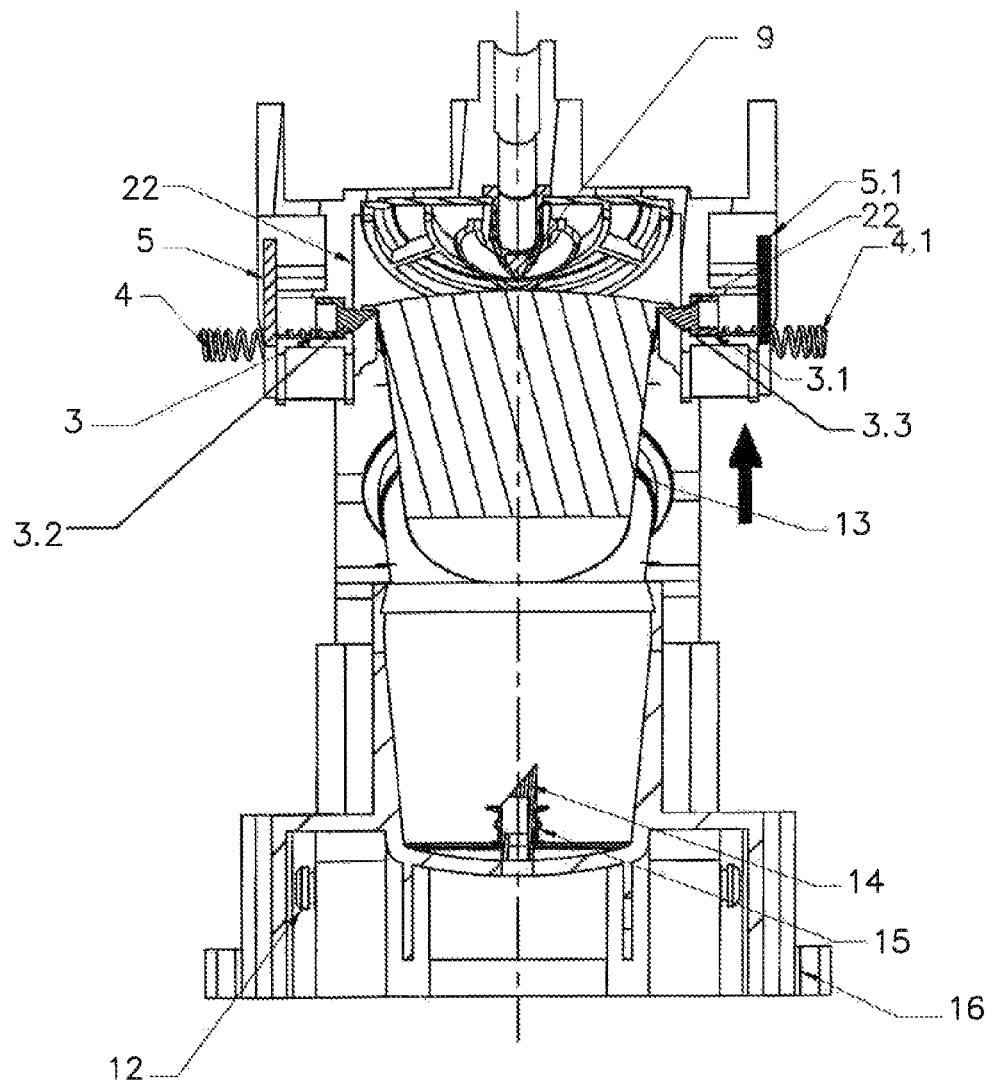
FIG 3.1

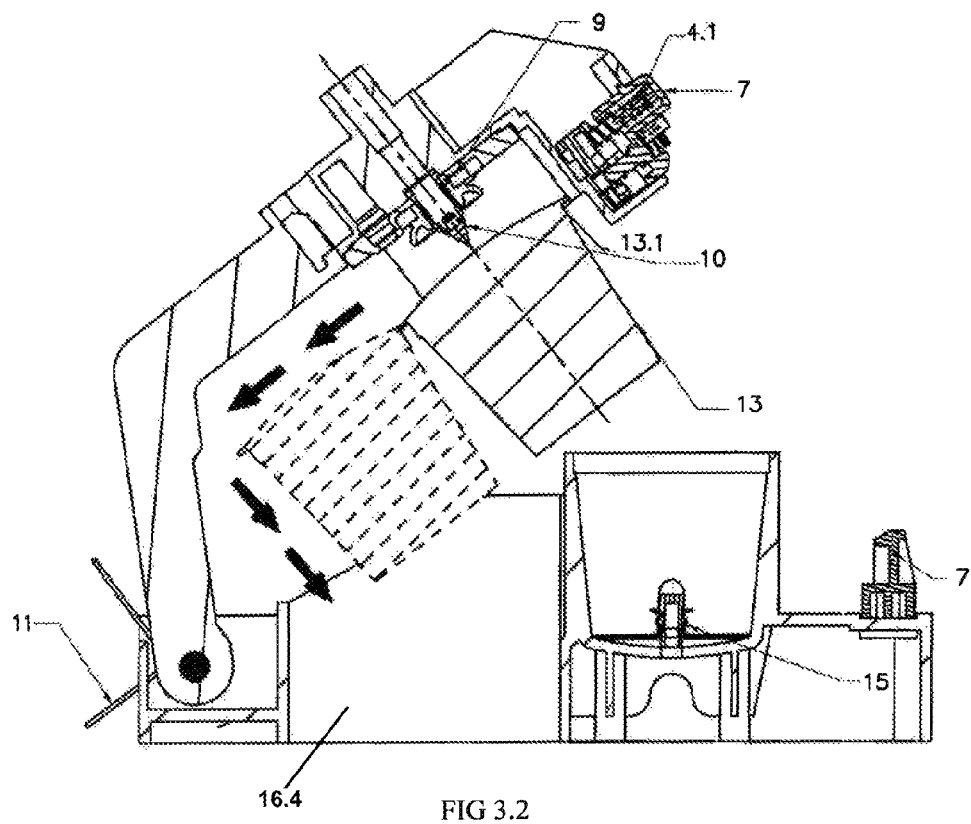
FIG 3.2
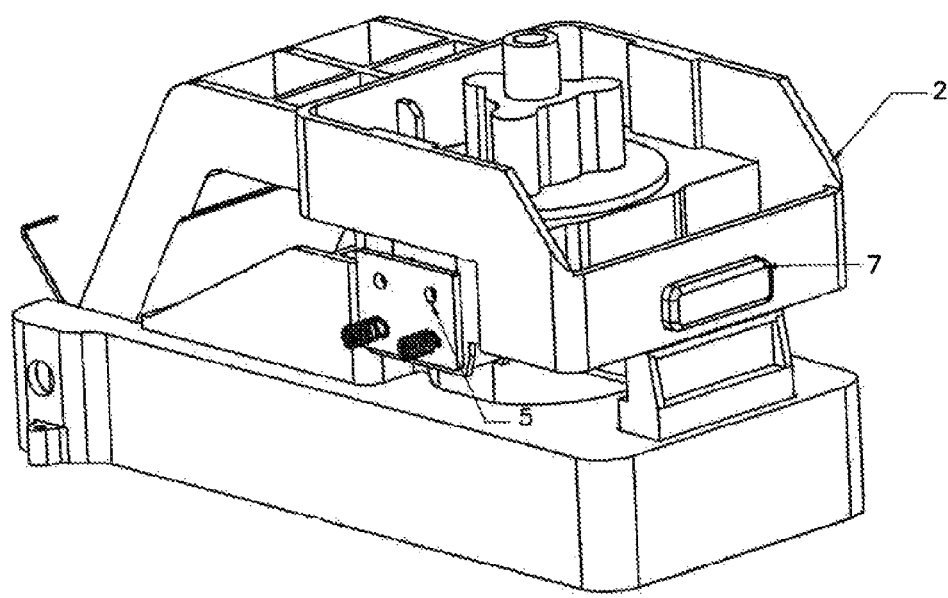
FIG 4

BREWING MECHANISM OF COFFEE MACHINE

FIELD OF THE INVENTION

The present invention relates to a brewing mechanism for coffee machine.

BACKGROUND OF THE INVENTION

Most of the existing brewing mechanisms for coffee machines have complicated structures and too many assemblies, making it hard to operate and inconvenient to use. For example, a commercially available brewing mechanism inside which the capsule can fall off automatically comprises a handle, a front cover assembly and a rear cover assembly, wherein the front cover assembly or the rear cover assembly is connected with a connecting rod by a rotatable handle, which makes the front cover assembly move forward and tightly press the rear cover assembly so as to fulfill a sealed engagement between them, and also makes the front cover assembly move backward and hook out the capsule which would thereafter fall into the capsule receiving section. The characteristic of the structure is that guiding slots are provided on the left and right sides of the front cover assembly, and a fixing shaft is provided on the front end of the front cover assembly for its connection with the connecting rod. The connecting rod is fixed on a frame fixing point and connected with the handle. The front cover assembly and the rear cover assembly together form a rocker arm structure which can move straightly. The opening and closing of the front cover assembly of the brewing mechanisms needs to be operated manually and there are too many assemblies and too complicated structure in this mechanism.

SUMMARY OF THE INVENTION

An objective of the present invention is to solve the above problems and to provide a brewing mechanism for coffee machine which has simple structure, convenient operation, high safety and reliable performance. The present invention is designed reasonably and very easy to use.

To achieve the objective, the present invention provides a brewing mechanism for coffee machine, comprising an upper cover assembly and a lower main body, wherein one end of the upper cover assembly is connected with one end of the lower main body by a hinge shaft, while another end of the upper cover assembly can be connected with another end of the lower main body by a locking structure. The lower main body has a brewing chamber and a capsule receiving section. A capsule can be placed inside the brewing chamber.

The upper cover assembly comprises an inlet piercing needle fixed in the upper cover assembly and a bottom piercing needle fixed in the lower main body, with the inlet piercing needle connected with an inlet of a coffee machine. The upper cover assembly also comprises a left sliding block and a right sliding block arranged within sliding slots respectively provided at a left side and a right side of the upper cover assembly, with the left sliding block and the right sliding block capable of sliding along the sliding slots.

A left reset spring and a right reset spring are respectively provided within the left sliding block and the right sliding block. A left fixing sheet and a right fixing sheet which are fixed on the upper cover assembly are respectively provided at an outer side of the left sliding block and an outer side of the right sliding block. A left hook and a right hook are respectively provided at an inner side of the left sliding block and an inner side of the right sliding block. The left hook and the right hook are capable of hooking two sides of the capsule, and automatically hooking out the capsule from the brewing chamber when the upper cover assembly rotates, making the capsule fall into the capsule receiving section.

In an implement of the present invention, the locking structure comprises a pressing spring, a sliding button and a locking cover. The pressing spring and the sliding button are arranged on the upper cover assembly, and the locking cover is arranged on the lower main body. The pressing spring is received within the sliding button that is received within a guiding frame fixed on the upper cover assembly. The sliding button can be locked with the fixing cover.

In an implement of the present invention, a peripheral protuberance is provided on an upper part of the capsule, facilitating the left hook and the right hook to hook out the capsule.

In an implement of the present invention, the pressing spring is arranged on a guiding post provided on the sliding button.

In an implement of the present invention, a guiding hole that matches the guiding post is provided within the guiding frame.

In an implement of the present invention, the inlet piercing needle is fixed on the upper cover assembly by a needle fixing sheet.

In an implement of the present invention, an inlet sealing ring is provided on a contacting surface between the inlet piercing needle and the upper cover assembly.

In an implement of the present invention, an outlet sealing ring is provided on a contacting surface between the bottom piercing needle and the lower main body.

In an implement of the present invention, the hinge shaft connecting the upper cover assembly and the lower main body is provided with a torsion spring.

In an implement of the present invention, a main body shaft hole is provided on the lower main body for passing through of the hinge shaft, and a cover assembly shaft hole is provided on the upper cover assembly for passing through of the hinge shaft.

In the present invention, the capsule can be hooked out from the brewing chamber when the upper cover assembly rotates. Then the capsule would automatically fall into the capsule receiving section along the sliding slots in the upper cover assembly because of the gravity. The present invention has simple structure, convenient operation, high safety and reliable performance. The present invention is well designed and practical.

BRIEF DESCRIPTION OF THE DRAWINGS

FIGS. 2.1 and 2.2 are schematic views of two different cross-sections of an embodiment of the present invention in its closing state.

FIGS. 3.1 and 3.2 are schematic views of two different cross-sections of an embodiment of the present invention in its opening state when the capsule is falling off.

FIGS. 4 and 5 are schematic views of an embodiment of the present invention respectively in its closing state and opening state.

| 1 | guiding frame | 1.1 | guiding hole |
|---|---|---|---|
| 2 | upper cover assembly | 3 | left sliding block |
| 3.1 | right sliding block | 4 | left reset spring |
| 4.1 | right reset spring | 5 | left fixing sheet |
| 5.1 | right fixing sheet | 6 | pressing spring |
| 7 | sliding button | 7.1 | guiding post |
| 8 | needle fixing sheet | 9 | inlet piercing needle |
| 10 | inlet sealing ring | 11 | torsion spring |
| 12 | hinge shaft | 13 | capsule |
| 14 | bottom piercing needle | 15 | outlet sealing ring |
| 16 | lower main body | 16.1 | brewing chamber |
| 16.2 | locking cover | 16.3 | main body shaft hole |
| 21 | cover assembly shaft hole | 16.4 | capsule receiving section |

DETAILED DESCRIPTION OF THE INVENTION

Figure 1:
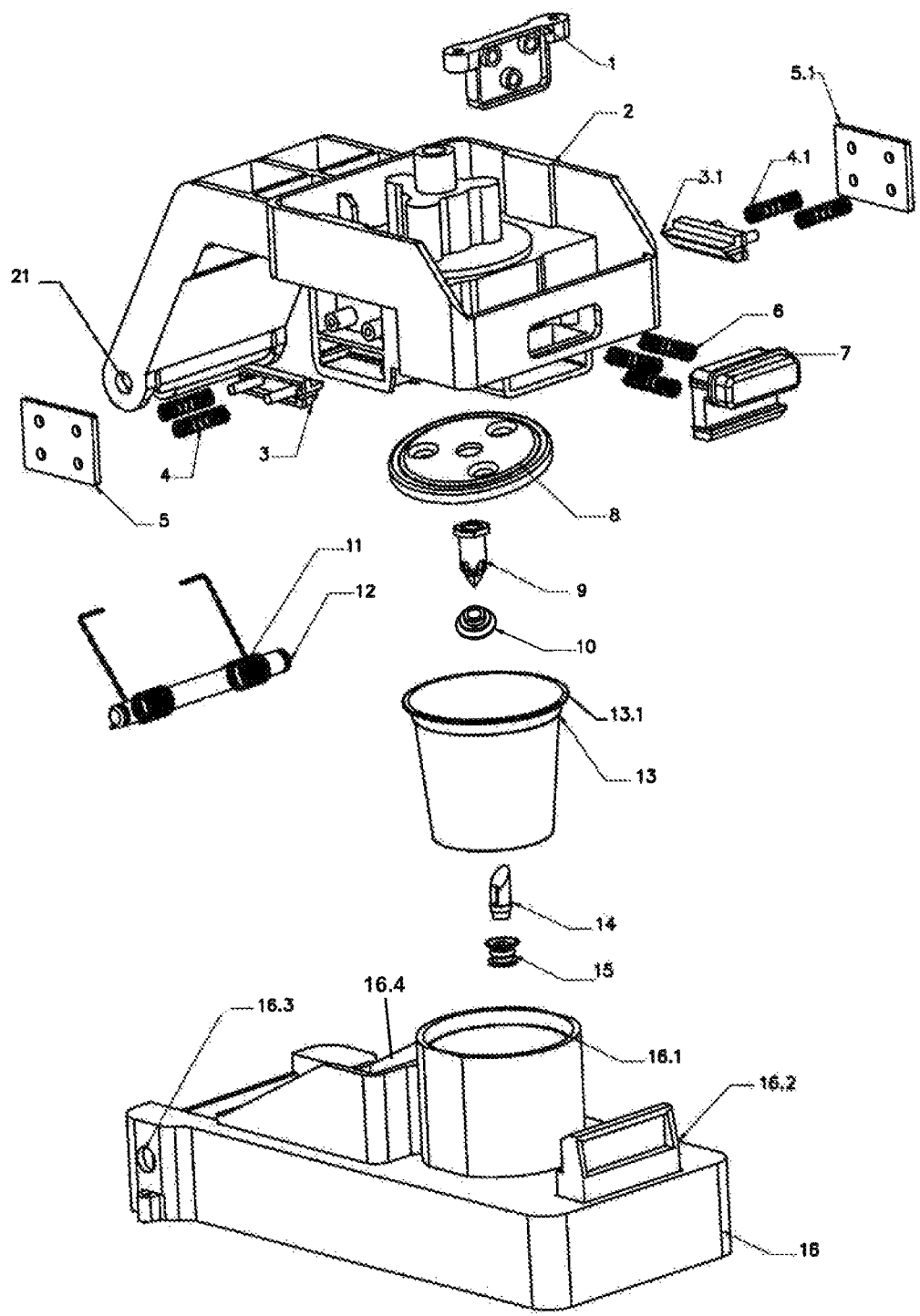
FIG. 1 is an exploded view of an embodiment of the present invention.
Figure 5:
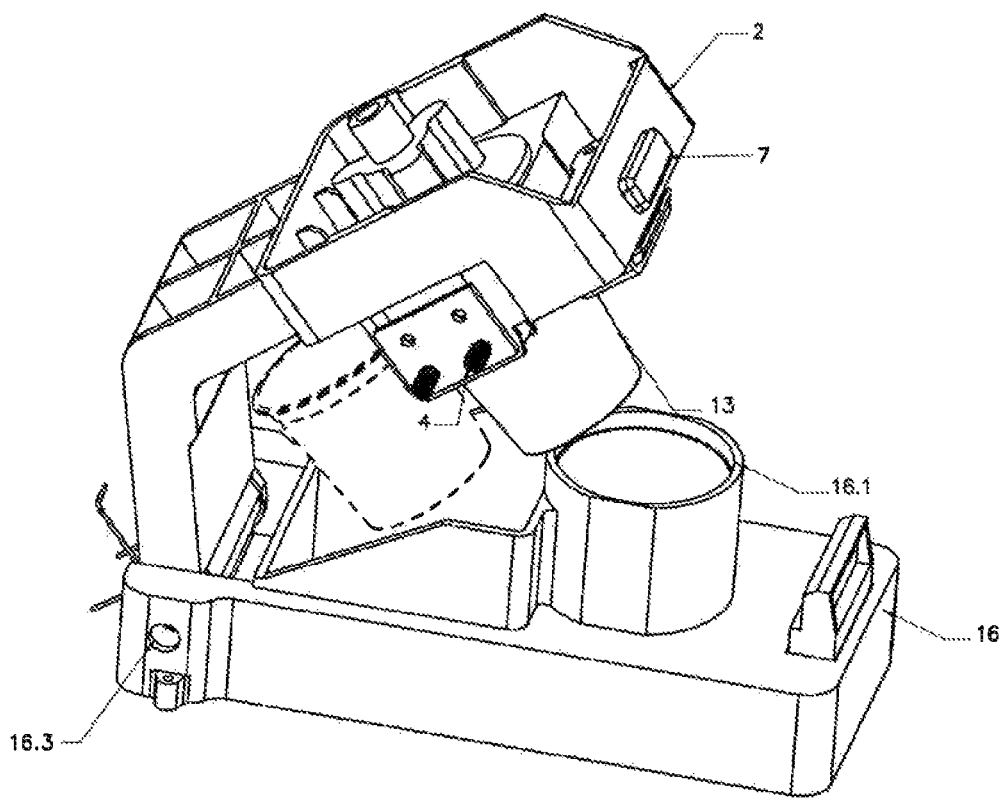

As shown in FIGS. 1-4, an exemplary brewing mechanism for coffee machine is provided, comprising an upper cover assembly 2 and a lower main body 16, wherein one end of the upper cover assembly 2 is connected with one end of the lower main body 16 by a hinge shaft 12, while another end of the upper cover assembly 2 can be connected with another end of the lower main body 16 by a locking structure. The lower main body 16 has a brewing chamber 16.1 and a capsule receiving section 16.4, a capsule 13 can be placed inside the brewing chamber 16.1.

The upper cover assembly 2 comprises an inlet piercing needle 9 fixed in the upper cover assembly 2 and a bottom piercing needle 14 fixed in the lower main body 16, with the inlet piercing needle 9 connected with an inlet of a coffee machine, and the upper cover assembly 2 also comprises a left sliding block 3 and a right sliding block 3.1 arranged within sliding slots respectively provided at a left side and a right side of the upper cover assembly 2, with the left sliding block 3 and the right sliding block 3.1 capable of sliding along the sliding slots.

A left reset spring 4 and a right reset spring 4.1 are respectively provided within the left sliding block 3 and the right sliding block 3.1. A left fixing sheet 5 and a right fixing sheet 5.1 which are fixed on the upper cover assembly 2 are respectively provided at an outer side of the left sliding block 3 and an outer side of the right sliding block 3.1. A left hook 3.2 and a right hook 3.3 are respectively provided at an inner side of the left sliding block 3 and an inner side of the right sliding block 3.1, wherein the left hook 3.2 and the right hook 3.3 are capable of hooking two sides of the capsule 13, and automatically hooking out the capsule 13 from the brewing chamber 16.1 when the upper cover assembly 2 rotates, making the capsule 3 fall into the capsule receiving section 16.4.

The locking structure comprises a pressing spring 6, a sliding button 7 and a locking cover 16.2. The pressing spring 6 and the sliding button 7 are arranged on the upper cover assembly 2, and the locking cover 16.2 is arranged on the lower main body 16, the pressing spring 6 is received within the sliding button 7 that is received within a guiding frame 1 fixed on the upper cover assembly 2. The sliding button 7 can be locked with the fixing cover 16.2.

Further more, a peripheral protuberance 13.1 is provided on an upper part of the capsule 13, facilitating the left hook 3.2 and the right hook 3.3 to hook out the capsule 13.

In the present embodiment, the pressing spring 6 is arranged on a guiding post 7.1 provided on the sliding button 7. A guiding hole 1.1 that matches the guiding post 7.1 is provided within the guiding frame 1.

In the present embodiment, the inlet piercing needle 9 is fixed on the upper cover assembly 2 by a needle fixing sheet 8. An inlet sealing ring 10 is provided on a contacting surface between the inlet piercing needle 9 and the upper cover assembly 2. An outlet sealing ring 15 is provided on a contacting surface between the bottom piercing needle 14 and the lower main body 16. The hinge shaft 12 connecting the upper cover assembly 2 and the lower main body 16 is provided with a torsion spring 11. A main body shaft hole 16.3 is provided on the lower main body 16 for passing through of the hinge shaft 12, and a cover assembly shaft hole 21 is provided on the upper cover assembly 2 for passing through of the hinge shaft 12.

The present embodiment works in the following way.

After the capsule 13 is placed into the brewing chamber 16.1, the upper cover assembly 2 can be rotated, making the torsion spring 11 compressed. With the locking engagement of the sliding button 7 and the fixing cover 16.2, the inlet sealing ring 10 can be sealed on the contacting surface between the inlet piercing needle 9 and the upper cover assembly 2, the outlet sealing ring 15 can be sealed on the contacting surface between the bottom piercing needle 14 and the lower main body 16, and the left reset spring 4 of the left sliding block 3 and a right reset spring 4.1 of the right sliding block 3.1 in the upper cover assembly 2 are compressed. The brewing chamber can thereby be closed.

When the brewing of the coffee is finished, the sliding button 7 of the upper cover assembly 2 can be pressed, making the sliding button 7 be separated from the fixing cover 16.2 of the lower main body 16. The upper cover assembly 2 would rotate because of the restoring force of the torsion spring 11. Then the left sliding block 3 and the right sliding block 3.1 would reset when rotating to the position of the peripheral protuberance 13.1 of the capsule 13. The left hook 3.2 of the left sliding block 3 and the right hook 3.3 of the right sliding block 3.1 can hook the capsule 13 out from the lower main body 16. Then the capsule 13 would fall down along the left sliding block 3 and the right sliding block 3.1 because of the gravity. Thereby the brewing chamber can be opened and the capsule can fall off automatically.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:

1. A brewing mechanism for coffee machine, comprising a lower main body including:
   a brewing chamber being configured to receive a capsule inside thereof;
   a capsule receiving section being configured to receive the capsule after the capsule is removed from the brewing chamber; and
   a bottom piercing needle fixed to the lower main body; and
   an upper cover assembly, one end of the upper cover assembly being connected with one end of the lower main body by a hinge shaft such that the upper cover assembly is configured to rotate about the hinge shaft to approach and retreat from the lower main body, the upper cover assembly including:
   an inlet piercing needle fixed to the upper cover assembly, the inlet piercing needle pointing in a rotational direction of the upper cover assembly and being connected with an inlet of a coffee machine;

a left sliding block having a left hook and a right sliding block having a right hook arranged within sliding slots respectively provided at a left side and a right side of the upper cover assembly, the left sliding block and the right sliding block being configured to slide along the sliding slots in directions to approach and retreat from each other, the left hook of the left sliding block and the right hook of the right sliding block pointing at each other;

a left reset spring and a right reset spring being respectively provided within the left sliding block and the right sliding block so as to apply a spring force to the left hook and the right hook in the direction to approach each other;

a left fixing sheet and a right fixing sheet being fixed to the upper cover assembly and being respectively provided at an outer side of the left sliding block and an outer side of the right sliding block; and a locking structure engaging with the upper cover assembly, wherein when the upper cover assembly rotates to approach the lower main body, another end of the upper cover assembly is connected and engaged with another end of the lower main body by the locking structure so as to close the brewing chamber of the lower main body by the upper cover assembly, and when the upper cover assembly rotates to retreat from the lower main body, the left hook and the right hook move in the rotational direction of the upper cover assembly, hook on two sides of the capsule, and remove the capsule from the brewing chamber, making the removed capsule be received by the capsule receiving section as the removed capsule slides down from the left hook and the right hook as a position of the upper cover assembly is raised by the rotational movement of the upper cover assembly.

2. The brewing mechanism for coffee machine of claim 1, wherein the locking structure comprises a pressing spring, a sliding button and a locking cover, the pressing spring and the sliding button are arranged on the upper cover assembly, and the locking cover is arranged on the lower main body, the pressing spring is received within the sliding button that is received within a guiding frame fixed on the upper cover assembly, and the sliding button is configured to lock with the locking cover.

3. The brewing mechanism for coffee machine of claim 2, wherein a peripheral protuberance is provided on an upper part of the capsule, facilitating the left hook and the right hook to hook out the capsule.

4. The brewing mechanism for coffee machine of claim 3, wherein the pressing spring is arranged on a guiding post provided on the sliding button.

5. The brewing mechanism for coffee machine of claim 4, wherein a guiding hole that matches the guiding post is provided within the guiding frame.

6. The brewing mechanism for coffee machine of claim 1, wherein the inlet piercing needle is fixed to the upper cover assembly by a needle fixing sheet.

7. The brewing mechanism for coffee machine of claim 6, wherein an inlet sealing ring is provided on a contacting surface between the inlet piercing needle and the upper cover assembly.

8. The brewing mechanism for coffee machine of claim 7, wherein an outlet sealing ring is provided on a contacting surface between the bottom piercing needle and the lower main body.

9. The brewing mechanism for coffee machine of claim 8, wherein the hinge shaft connecting the upper cover assembly and the lower main body is provided with a torsion spring.

10. The brewing mechanism for coffee machine of claim 9, wherein a main body shaft hole is provided on the lower main body for passing through of the hinge shaft, and a cover assembly shaft hole is provided on the upper cover assembly for passing through of the hinge shaft.

* * * * *